Aug. 14, 1928.

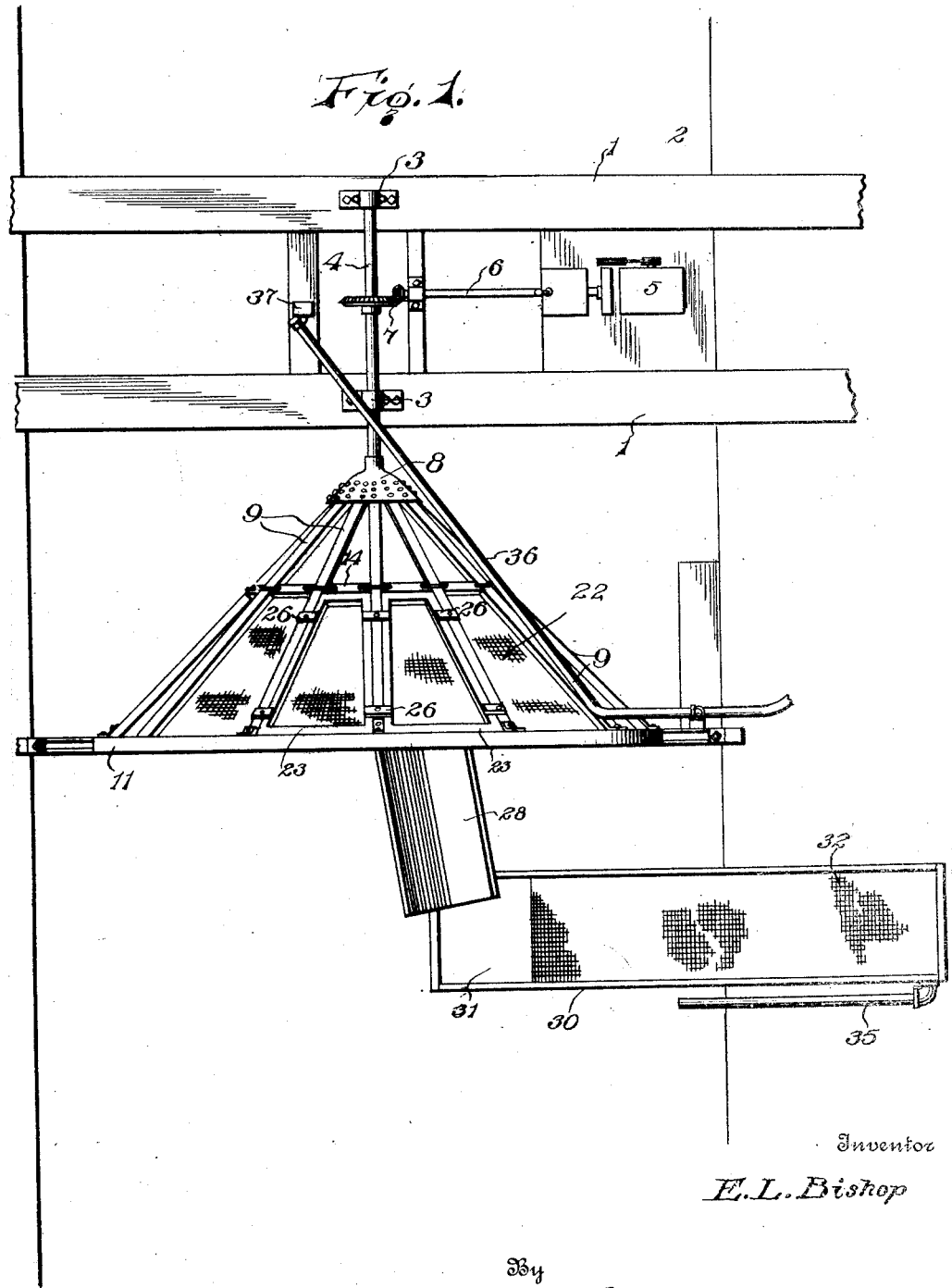

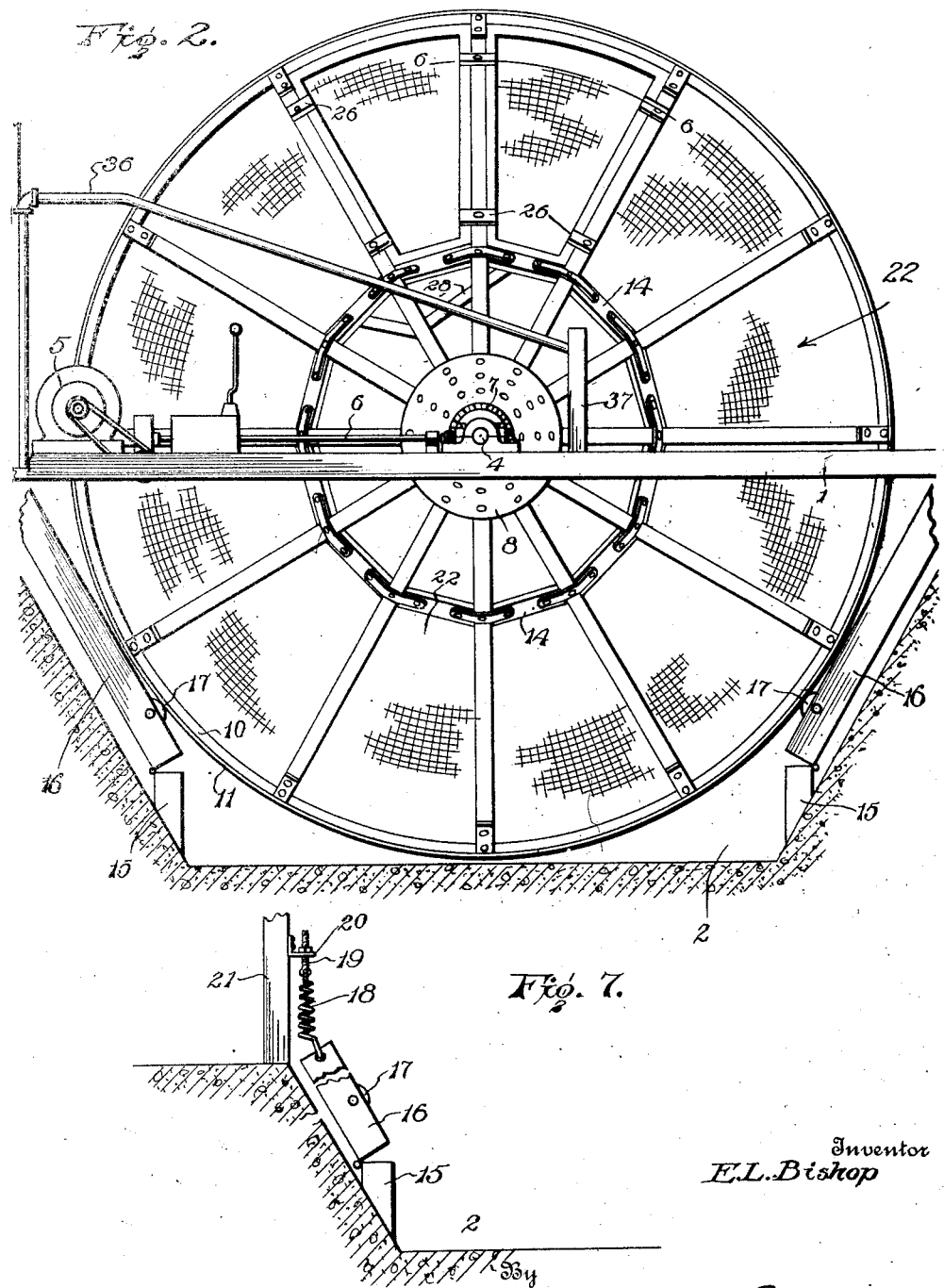

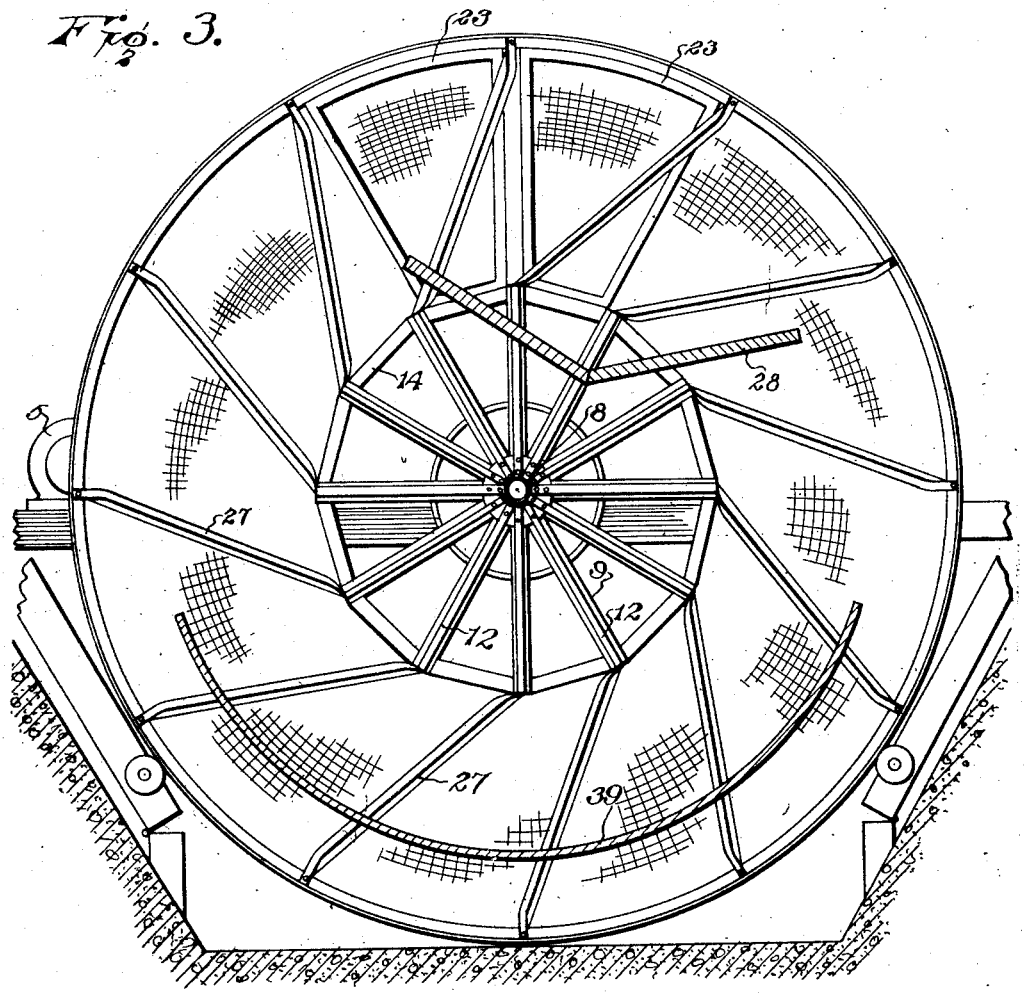

E. L. BISHOP

FILTER

Filed Aug. 11, 1926  4 Sheets-Sheet 4

1,680,848

Inventor
E. L. Bishop

By
Lacey & Lacey, Attorneys

Patented Aug. 14, 1928.

1,680,848

UNITED STATES PATENT OFFICE.

ERNEST L. BISHOP, OF LINDSAY, CALIFORNIA.

FILTER.

Application filed August 11, 1926. Serial No. 128,672.

This invention relates to filters and has special reference to means for removing from the water of irrigation ditches the slime, moss and other foreign matter which tends to collect therein and detract from its value for irrigating the land. The invention provides an apparatus which is installed in a canal near the source of supply and adapted to take up from the water all foreign matter and deliver the same to a settling tank from which the clear water is returned to the canal for use. The invention provides an apparatus for the stated purpose which will not interfere with the flow of the water, which may be operated under light power, and which is efficient in operation. One embodiment of the invention is illustrated in the accompanying drawings, and the invention resides in certain novel features which will be particularly pointed out in the appended claims.

In the drawings:

Figure 1 is a plan view of an apparatus constructed in accordance with the invention;

Fig. 2 is an end elevation of the same looking up stream;

Fig. 3 is a similar view, with parts in section, looking down stream;

Fig. 6 is a detail section of a portion of the screen or filtering wheel;

Fig. 7 is a detail of a support for the filtering wheel.

Figure 4:
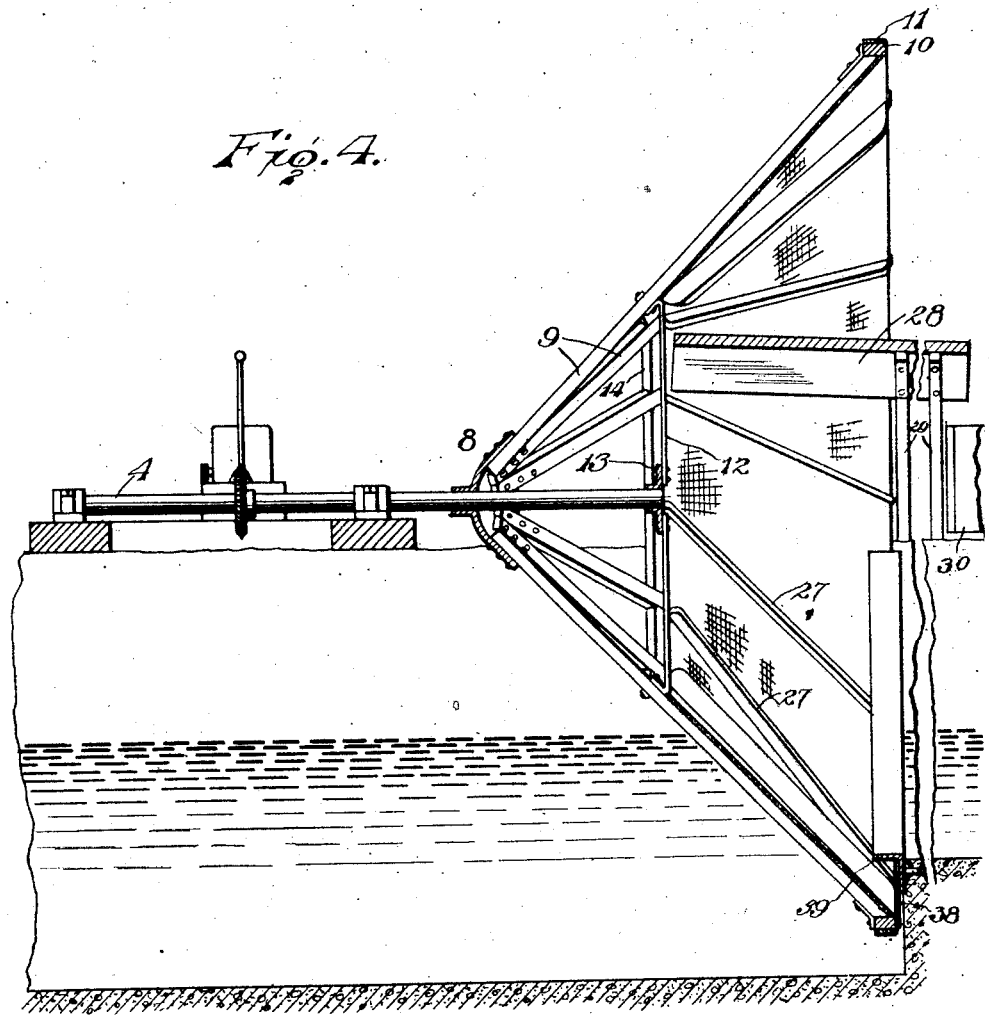
Fig. 4 is a longitudinal vertical section.
Figure 5:
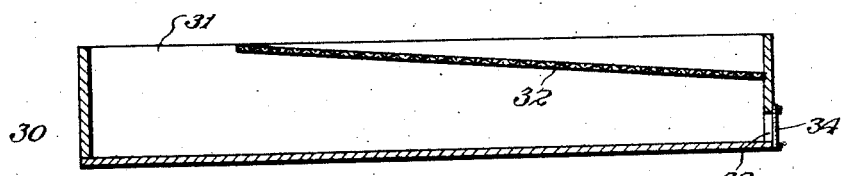
Fig. 5 is an enlarged longitudinal section of the settling tank.

Referring more particularly to the drawings, the reference numeral 1 indicates sills or beams which are extended across the canal, indicated at 2, and supported in any convenient or preferred manner upon the banks of the canal. Mounted in bearings 3 upon these beams or sills is a shaft 4, and supported upon a suitable platform or frame carried by and between the beams is a motor 5 having its shaft 6 extended to and connected with the shaft 4 by gearing 7. The motor is preferably a small electric motor and the gearing may be of any appropriate form, these parts being illustrated in the drawings in a more or less conventional manner. The beams 1 are located near the main canal or source of supply and the shaft 4 extends down stream from the main canal or source of supply. To the said shaft near the lower end thereof is secured a hub 8, in the form of a bowl, and extending upon diverging radial lines from the hub are spokes 9 which may be provided in any desired number. These spokes are secured at one end rigidly to the inner side of the hub and at their opposite ends are secured to a rim 10 having a metallic tire 11 shrunk thereon. Extending between the lower extremity of the shaft 4 and intermediate points of the spokes 9 are braces 12 having their outer ends rigidly secured to the spokes and their inner ends rigidly secured to a flange or collar 13 on the shaft. Between adjacent spokes, at the junction of the same with the braces 12, are girders 14 whereby a rigid and strong structure is attained. In the bed of the canal at opposite sides of the central longitudinal line thereof and in the vertical plane of the rim 10 and tire 11 are anchored posts 15 to which are hingedly secured the lower ends of frames 16 which extend upwardly over the sides of the canal to the banks thereof, as shown most clearly in Fig. 7. Rollers 17 are mounted in the lower portions of these frames 16 to be engaged by and support the rim 10 so that, while the filtering wheel will be firmly supported, the strain upon the shaft 4 will be reduced and the wheel may rotate readily at all times. To the upper ends of the frames 16 are attached springs 18 having their upper ends attached to adjusting bolts 19 which are carried by brackets 20 secured to posts 21 on the banks of the canal. The bolts 19 may obviously be adjusted to impart the proper tension to the springs 18 and the springs 18 will act to hold the rollers 17 in constant contact with the rim 11, while at the same time yielding to any slight irregularities or deviations from a true circle which may happen to occur in the rim.

Covering the space defined by the spokes 9, the girders 14 and the rim 10, is a screen 22 which is preferably of wire netting, and this screen may be continuous through the entire circumferential extent of the wheel if desired, but I prefer to provide trapezoidal frames 23 to fit between some of the spaces between the spokes, which frames carry screen members 24 so that, when desired, access may be had to the interior of the wheel to clean or repair the same. In the present instance, the frames 23 are shown provided in adjoining sections of the wheel but, of course, they may be located at diametrically opposite points or may be provided in greater numbers and disposed at such intervals around the wheel as may be deemed most advantageous. The frames are secured removably in place by resting upon shoulders or rabbets 25 provided upon the adjacent spokes 9 at the inner sides thereof, and buttons or other form of latches 26 carried by the spokes and adapted to project over the edges of the frames, as will be understood upon reference to Fig. 6.

Upon the inner side of the wheel are provided take-up baffles 27 which are disposed in angular relation to the lines of the spokes and are preferably so located that each baffle extends diagonally between the lines occupied upon the outer side of the screen by two adjacent spokes. These baffles project inwardly from the inner surface of the screen and are adapted, as the wheel is rotated, to pass through the water and take up the moss and other objectionable matter therein and carry it around to a higher point of the wheel where it will be discharged into a flume 28 suitably supported upon a frame 29 at the lower end of the wheel and extending within the wheel in proper position to receive the discharge, as shown most clearly in Fig. 4. The lower end of this flume is arranged over the receiving end of a settling tank 30 which is supported in any convenient manner with one end resting on the bank of the canal and its other end disposed under the discharge end of the flume. The receiving end of this tank has its top entirely open and unobstructed, as shown at 31, and extending from said open space toward the opposite end of the tank is a downwardly inclined screen 32, the bank end of the tank being provided with a clean-out opening 33 normally closed by a gate 34. It will be readily noted that a clear space is provided within the tank above the screen 32 and a discharge pipe 35 communicates with the said space at the lower end of the screen and extends therefrom to a point over the canal, as shown in Fig. 1, so that the clear water will be returned to the canal. It will be noted that the water is discharged into the tank so that it will flow under the screen and as the level of the water rises it will pass through the screen so that the moss, slime and other matter carried into the tank by the water will be caught and restrained and only clear water permitted to pass from the tank. When the accumulation of the foreign matter has become sufficiently great, the operation of the apparatus may be temporarily arrested and the gate 34 opened so that the tank may be cleaned by withdrawing the accumulations through the clean-out opening 33.

In order that the moss and like matters may be prevented from adhering to the screen and may be constantly removed therefrom so as to be discharged into the flume 28, a water pipe 36 is arranged close to the outer surface of the screen and the wheel and is provided with a plurality of perforations in its under side so that a constant spray of water will be discharged onto the screen and will pass through the same at a point over the flume and, consequently, wash into the flume the moss and other matters which tend to cling to the screen. This pipe 36 has one end closed and supported by a post 37 erected upon one of the sills 1 and its other end is connected to a pump (not shown) which draws water from a point of the canal below the filtering apparatus so that clear water will be discharged onto the wheel.

As shown in Fig. 4, the bottom of the canal or ditch is higher at the point where the filtering wheel is located than it is under the wheel and at lower points of the canal thereby providing a step or shoulder 38, and to this step or shoulder I secure a chute or guide 39 which extends across the bottom of the canal and up the sides of the same to project into the wheel and direct the water into the interior of the wheel and prevent it dropping between the entrance to the wheel and the bottom of the canal so that all the water will be forced to flow into the wheel and be subjected to the clearing action of the same.

From the foregoing description, taken in connection with the accompanying drawings, it will be seen that I have provided a very efficient and compact apparatus which may be installed in any canal and by the use of which the foreign matters which detract from the value of the water as an irrigation agent will be removed.

Having thus described the invention, I claim:

1. An apparatus for the purpose set forth comprising a shaft, a plurality of radially disposed diverging spokes extending from an intermediate point in the length of the shaft, a rim connecting the outer ends of said spokes, radial braces secured to and extending between the end of the shaft and intermediate points of the spokes, girders connecting the spokes at the ends of said braces, and a conical screen carried by the rim, the spokes and the girders.

2. An apparatus for the purpose set forth comprising a shaft, a plurality of radially disposed diverging spokes carried by the shaft, a rim connecting the outer ends of said spokes, braces extending between the end of the shaft and intermediate points of the spokes, girders connecting the spokes at the intermediate points thereof, a screen carried by the rim, the spokes and the girders, and take-up baffles secured upon the inner side of the screen and extending diagonally between adjacent spokes.

3. An apparatus for the purpose set forth comprising a rotatable screen, means on the screen for taking up foreign matters in water flowing through the screen, means for removing the foreign matters from the screen, and yieldably supported means within the stream for engaging and supporting the receiving end of the screen.

In testimony whereof I affix my signature.

ERNEST L. BISHOP. [L. S.]